July 28, 1931. H. F. HITNER 1,815,978
APPARATUS FOR MAKING GLASS
Original Filed May 26, 1928 3 Sheets-Sheet 3

INVENTOR
Harry F Hitner
by
James C Bradley
Atty

Patented July 28, 1931

1,815,978

UNITED STATES PATENT OFFICE

HARRY F. HITNER, OF OAKMONT, PENNSYLVANIA, ASSIGNOR TO PITTSBURGH PLATE GLASS COMPANY, A CORPORATION OF PENNSYLVANIA

APPARATUS FOR MAKING GLASS

Application filed May 26, 1928, Serial No. 280,762. Renewed December 15, 1930.

Figure 1:
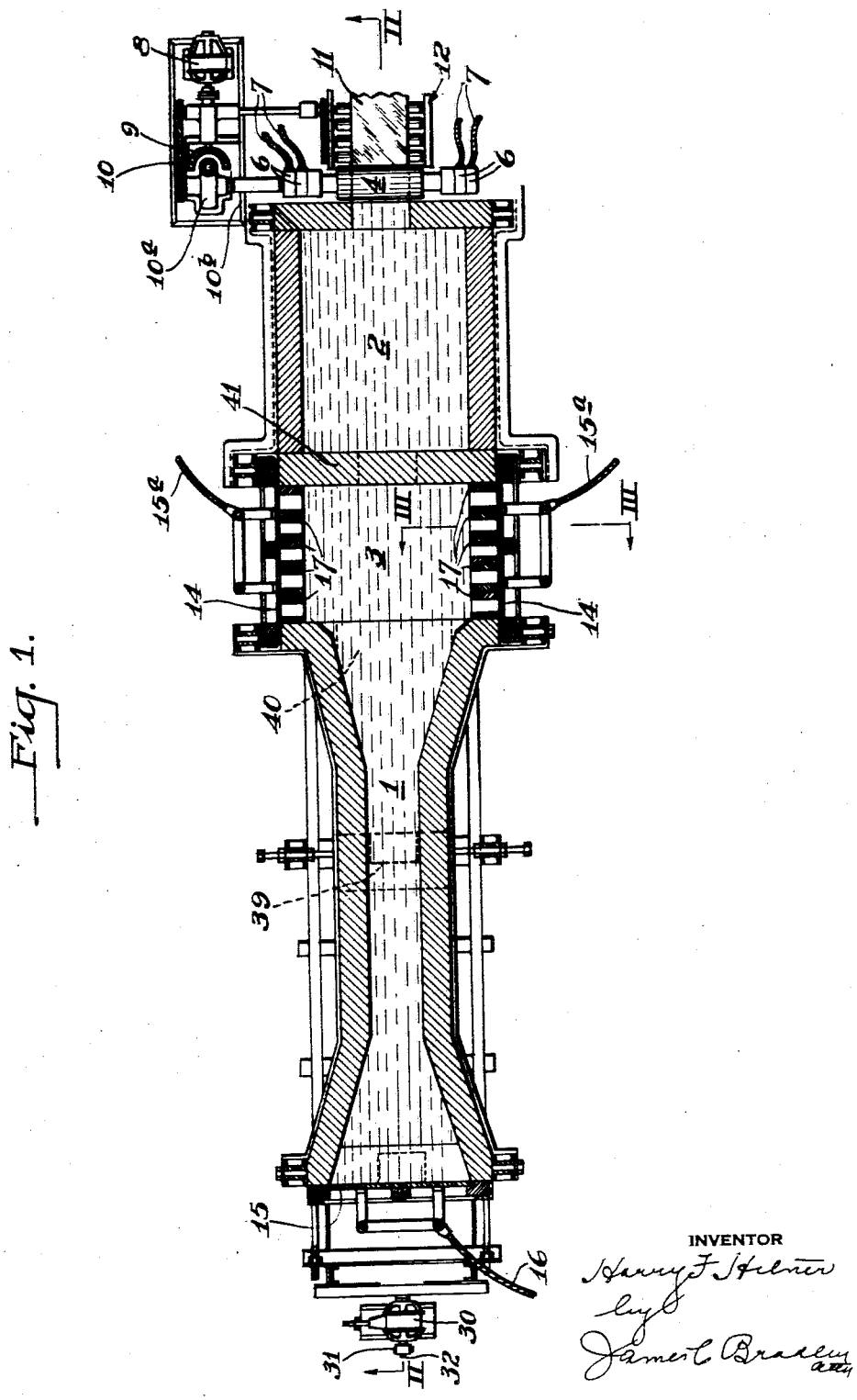
Figure 2:
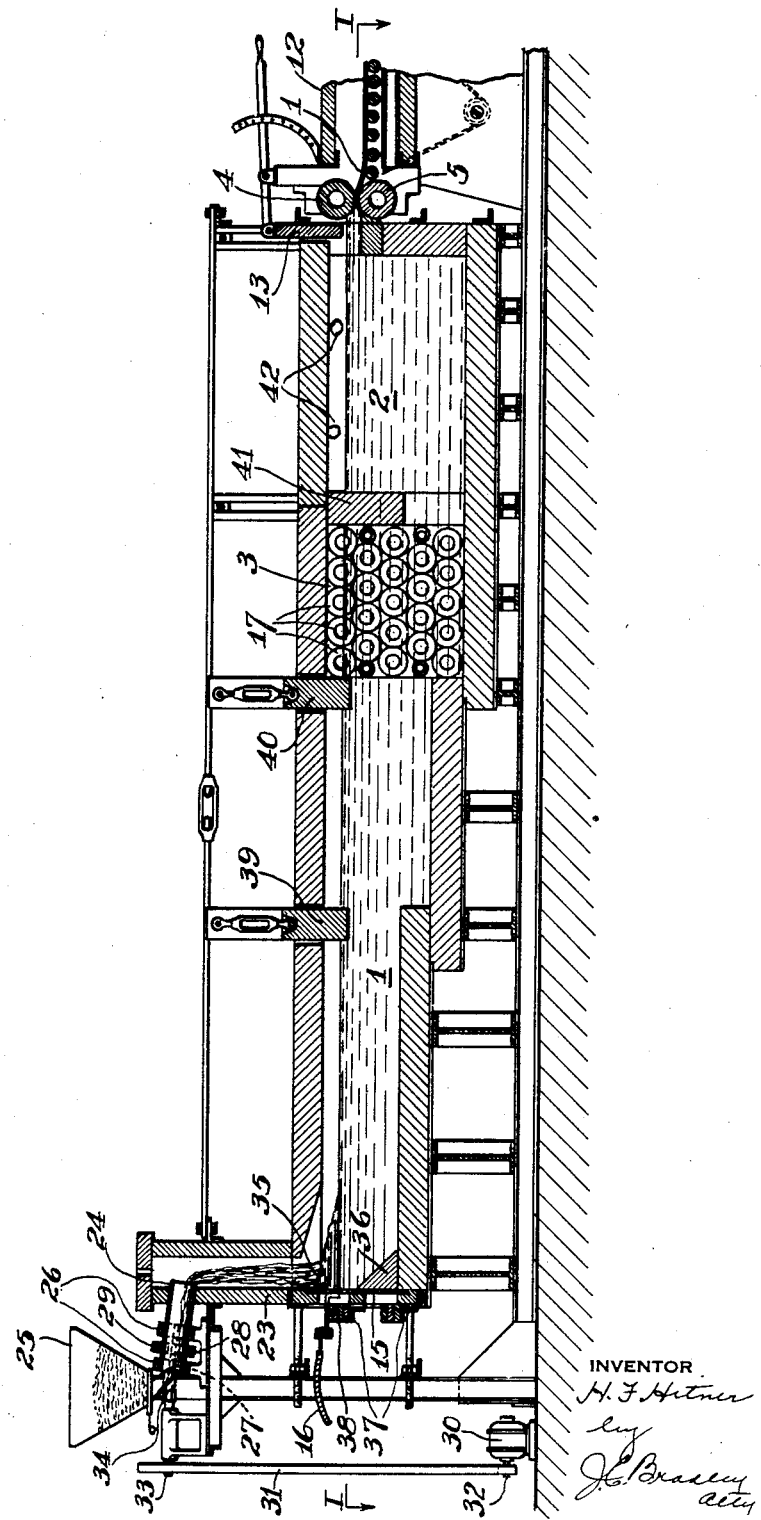
Figure 3:
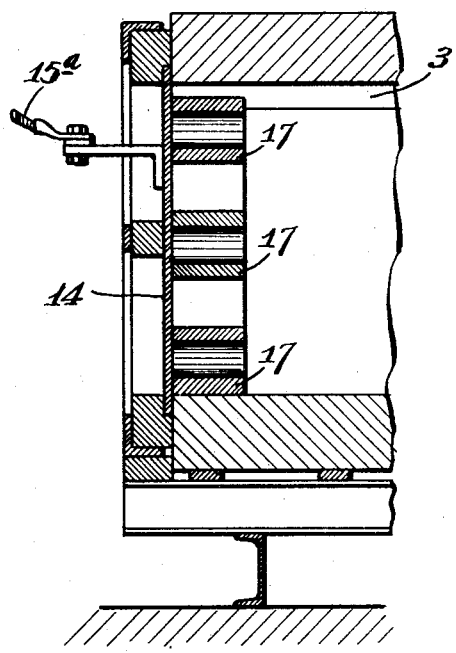
Figure 4:
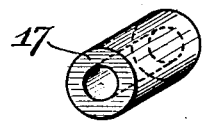

The invention relates to apparatus for making glass by the use of electricity as a melting and fining agency, and involves certain improvements over the apparatus shown and described in my application, Serial No. 193,404. The invention has for its primary objects the provision of improved means for preventing the metal plates which are employed as electrodes from overheating, such overheating tending to reduce the efficiency of the apparatus due to heat losses, and also causing a wearing away of the plates and a discoloration of the molten glass with which the plates contact. Certain embodiments of the invention are illustrated in the accompanying drawings, wherein:

Figure 1 is a horizontal section on the line I—I of Fig. 2 Fig. 2 is a vertical section on the line II—II of Fig. 1. Fig. 3 is a section on the line III—III of Fig. 1. And Fig. 4 is a perspective view of one of the clay tubes used in the construction of Figs. 1 to 3. And 5, 6 and 7 are perspective views of modified forms of shielding devices for the electro- plates to be used in place of the clay tubes.

The tank comprises a melting section 1 and a refining section 2, the section 1 being provided with a transverse bay 3 at its forward end. The refining section of the tank is shown as provided at its outlet end with a sheet forming device in the form of the rolls 4 and 5, but it will be understood that the method of utilizing the glass is immaterial insofar as the present invention is concerned. The rolls 4 and 5 are hollow and water cooled by means of the swivels 6, 6 and water supply pipes 7, 7 (Fig. 1). The rolls are driven from the motor 8 through the intermediary of the gears 9 and 10, worm gearing in the casing 10a and tumbler shafts 10b. The glass sheet 11, which is formed, is conducted into the roller leer 12. A gate 13 is provided for cutting off the flow of glass to the rolls when this becomes necessary for replacements or repairs.

Figure 5:
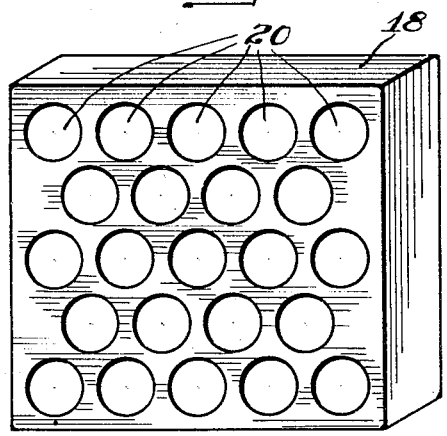
Figure 6:
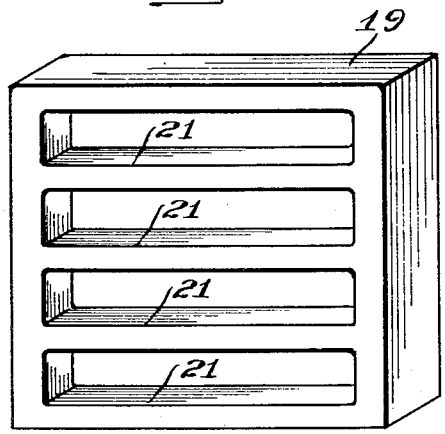

The tank is provided with three electrodes 14, 14 and 15 in the form of plates of any suitable material having the requisite degree of refractoriness and conductivity; such as, chromium iron alloy containing about 25 per cent of chromium. The plates 14, 14 are connected to the terminals 15a, 15a connected to the same line of a single phase current supply, while the terminal 16 is connected to the other line of such supply, it being understood that, if desired, the apparatus might be arranged to operate with three-phase current. In order to protect the plates 14, 14 from overheating, a honey-comb structure of clay is provided in front of each plate, as indicated in Figs. 1, 2 and 3, such structure being made up of the clay tubes 17, one of which is shown in perspective in Fig. 4. These tubes interrupt the circulation of hot glass which would otherwise occur along the faces of the plates, such flow having a tendency to cause an overheating of the plates and a wearing away of the surface. I have found that the use of the clay protecting means maintains the electrode plates at a very substantially lower temperature than they have when protecting means are not used and that the efficiency of the furnace is materially increased by the use of this expedient. As a substitute for the clay protecting means made up of tubes 17, the perforated clay plates 18 and 19 of Figs. 5 and 6, respectively, may be employed, the plate 18 being provided with perforations 20, circular in cross section, extending therethrough, while the plate 19 is provided with perforations in the form of slots 21. It is also possible to use a protecting means in the form of a refractory plate, such as, the plate 22 of Fig. 7, which is not provided with perforations. This plate is preferably made of less thickness than the plates 18 and 19 of Figs. 5 and 6. It will be understood that the invention is not limited to the use of clay in the composition of the protecting means 17, 18, 19 and 22, but that any other suitable refractory composition, such as mullite, may be used. The use of these protecting means further prevents any discoloration of the glass from the metal plate, such as might occur if the plates become heated to too great an extent over their areas of contact with the molten glass.

Batch is supplied just in front of the rear electrode 15 through the stack 23. Leading into this stack is a supply tube 24 to the rear end of which batch is fed from the hopper 25. The tube is mounted for rotation in the bearing 26 and is rotated from the shaft 27 extending along the side of the tube by means of a spur gear 28 on such shaft, meshing with a gear 29 through which the tube extends. The shaft 27 is driven from the motor 30 through the intermediary of the belt 31 which passes around pulleys on the shafts 32 and 33 and the universal coupling 34 which connects the ends of the shafts 27 and 33. The batch which is supplied just in front of the electrode plate 15 serves in a measure the same function as that performed by the clay tubes 17 in front of the plates 14, 14 in that the batch cools the plate and acts as an insulator between the plate and molten glass. The effect of the current in melting the batch in the mass 35 is increased by the use of the clay protecting block 36, triangular in cross section, as indicated in Fig. 2, which insulates the lower half of the plate from contact with the molten glass, thus insuring that the major portion of the current will pass through the upper portion of the body of glass. Brackets 37 extending across the rear side of the plate 15 serves as supports for a series of clay strips 38, which can be piled up to any desired height and serve as a means for regulating the temperature of the plate 15 to a certain extent. When the plate becomes cooled to too great an extent, more strips are added, thus reducing the cooling action of the atmosphere upon the plate, and when the plate becomes too hot, some of these strips are removed. The stack 23 acts as an outlet for a part of the heated gases in the tank, the upflow of gas through the stack serving to preheat the batch which is flowing in from the tube 24.

A pair of gates or shear cakes 39 and 40 are preferably employed along the length of the portion 1 of the tank, such gates acting as skimming devices and serving to regulate or control the flow of air longitudinally of the tank. The refining portion 2 of the tank is separated from the melting portion 1 by means of the wall 41 so that the cooler glass from the bay 3 flows into the refining chamber. The temperature in this refining chamber is regulated by means of gas burners projecting through the openings 42 in the side walls of the tank. The use of the wall 41 permits a regulation of the temperature in the chamber 2 independent of that in the bay 3.

Figure 7:
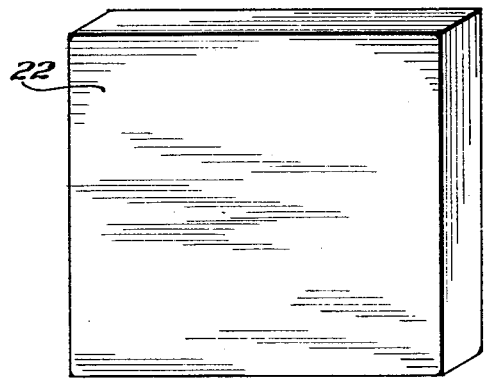

In case an imperforate plate, such as that of Fig. 7, is used as a protecting means for the electrodes 14, 14 in place of the perforated protecting members 17, 18 or 19, a refractory material must be employed which is of good electric conductivity at the temperature to which the plate is exposed. Zirconium oxide meets this requirement and will not discolor the glass. Other of the highly refractory oxides or combinations of such oxides may also be used.

The tank and associated apparatus is suitable for the reduction of vitreous products other than those commonly referred to as glass, such as the vitreous enamels, which are a species of glass, and silicate of soda, which is sometimes referred to as soluble glass. It will be understood, therefore, that the term "glass" is used in its broad sense and that the furnace is not limited to use in the melting of the ordinary forms of glass.

What I claim is:

1. In combination in apparatus for making glass, a tank for melting the glass, metal electrodes extending into the tank, a foraminous, refractory, protecting means extending over the face of one of such electrodes and permitting contact of the molten glass in the tank with the electrode, and means for supplying current to the electrodes to secure a flow of current through the glass in the tank.

2. In combination in apparatus for making glass, a tank for melting glass, metal electrodes extending into the tank, a clay protecting means of honey-comb formation extending over the face of one of said electrodes and permitting contact of the molten glass in the tank with the electrode, and means for supplying current to the electrodes to secure a flow of such current through the glass in the tank.

3. In combination in apparatus for making glass, a tank having an upright metal electrode plate constituting a part of one of the side walls of the furnace and extending to the surface of the glass from a level below such surface, means for supplying current to said plate and to the glass at a point remote from the electrode to secure a flow of current through the glass in the tank, and means for supplying batch to the tank just in front of said plate so that such batch while melting lies against the plate.

4. In combination in apparatus for making glass, a tank having an upright metal electrode plate constituting a part of one of the side walls of the furnace and extending to the surface of the glass from a level below such surface, means for supplying current to said plate and to the glass at a point remote from the electrode to secure a flow of current through the glass in the tank, and means for supplying batch to the tank just in front of said plate, so that such batch while melting lies against the plate, said plate extending above the surface of the glass and contacting with the glass in the tank for only a portion of the depth of the tank.

5. In combination in apparatus for making glass, a tank having an upright metal electrode plate constituting a part of one of the side walls of the furnace and extending to the surface of the glass from a level below such surface, means for supplying current to said plate and to the glass at a point remote from the electrode to secure a flow of current through the glass in the tank, and means for supplying batch to the tank just in front of said plate so that such batch while melting lies against the plate, said plate extending downward from a point above the surface of the glass and having a part of its surface at its lower portion shielded from contact with the glass.

6. In combination in apparatus for making glass, a tank having metal electrode plates constituting a part of the walls of the furnace, means for supplying current to the plates to secure a flow of current through the glass in the tank, and a plate of refractory oxide which is a conductor of electricity when heated to a high temperature, and which will not discolor the glass, extending over the inner face of one of said plates in contact therewith and having its outer face in contact with the glass.

7. In combination in apparatus for making glass, a tank having metal electrode plates constituting a part of the walls of the furnace, means for supplying current to the plates to secure a flow of current through the glass in the tank, and a plate of mullite extending over the inner face of one of said plates in contact therewith and having its outer face in contact with the glass.

8. In combination in apparatus for making glass, a tank having metal electrode plates constituting a part of the walls of the furnace, means for supplying current to the plates to secure a flow of current through the glass in the tank, and a plate of zirconium oxide extending over the inner face of one of said plates in contact therewith and having its outer face in contact with the glass.

In testimony whereof, I have hereunto subscribed my name this 21st day of May, 1928.

HARRY F. HITNER.